(12) United States Patent
Carter (10) Patent No.: US 7,559,418 B2
(45) Date of Patent: Jul. 14, 2009

(54) METHOD OF EXCHANGING COINS INVOLVING NON-CASH EXCHANGE OPTIONS

(75) Inventor: Kenneth Carter, Lake Quivera, KS (US)

(73) Assignee: Balance Innovations, LLC, Lenexa, KS (US)

( * ) Notice: Subject to any disclaimer, the term of this patent is extended or adjusted under 35 U.S.C. 154(b) by 1303 days.

(21) Appl. No.: 10/401,191

(22) Filed: Mar. 26, 2003

(65) Prior Publication Data

US 2004/0188221 A1  Sep. 30, 2004

(51) Int. Cl.
G06M 1/00 (2006.01)
G06M 3/00 (2006.01)
G07F 9/08 (2006.01)

(52) U.S. Cl. .................................... 194/215
(58) Field of Classification Search ............ 194/215
See application file for complete search history.

(56) References Cited

U.S. PATENT DOCUMENTS

| | | |
|---|---|---|
| 4,319,326 A | 3/1982 | Uchida |
| 4,447,885 A | 5/1984 | Biss |
| 4,495,627 A | 1/1985 | Nishimura |
| 4,512,428 A | 4/1985 | Bullivant |
| 4,522,275 A | 6/1985 | Anderson |
| 4,532,641 A | 7/1985 | Nishimura |
| 4,646,767 A | 3/1987 | Hikita |
| 4,674,060 A | 6/1987 | Larkin |
| 4,682,288 A | 7/1987 | Taipale |
| 4,752,874 A | 6/1988 | Meyers |
| 4,839,505 A | 6/1989 | Bradt |
| 4,868,489 A | 9/1989 | Kowalski |
| 4,967,576 A | 11/1990 | Warfman |
| 5,126,732 A | 6/1992 | Mardon |
| 5,128,862 A | 7/1992 | Mueller |

(Continued)

FOREIGN PATENT DOCUMENTS

FR    2586840    3/1997

(Continued)

OTHER PUBLICATIONS

Twenty-First Century Hotel Systems, Twenty-First Century Inn System Procedures Manual vol. IV: Front Office System Training (1993).

*Primary Examiner*—Jeffrey A Shapiro
(74) *Attorney, Agent, or Firm*—Spencer Fane; Britt & Browne LLP (57) ABSTRACT

A method of exchanging coins that maximizes benefits to a host/operator of an implementing machine (10) and minimizes or eliminates any transaction charges to users of the machine (10) by providing users an establishment-specific or otherwise dedicated cash-substitute or other non-cash option in return for the coins. Possible exchange options include dispensing a disposable first type of cash-substitute device (40a,40b); storing a credit on a re-usable second type of cash-substitute device (44); making a charitable donation; and crediting an account. Because the establishment own or rents and operates the machine (10), exchanged coins can be used to replenish cash drawers or to replenish its coin dispensers or dispensing machines used, for example, at or by checkstands or self-checkout stands or self-service checkout systems, and because the exchange options are primarily establishment-specific, sales increase.

15 Claims, 4 Drawing Sheets

U.S. PATENT DOCUMENTS

| | | |
|---|---|---|
| 5,193,629 A | 3/1993 | Lare |
| 5,227,966 A | 7/1993 | Ichiba |
| 5,308,120 A | 5/1994 | Thompson |
| 5,366,404 A | 11/1994 | Jones |
| 5,396,417 A | 3/1995 | Burks |
| 5,397,264 A | 3/1995 | Gross |
| 5,564,546 A | 10/1996 | Molbak |
| 5,756,977 A | 5/1998 | Biss |
| 5,805,456 A | 9/1998 | Higham |
| 5,813,510 A | 9/1998 | Rademacher |
| 5,830,054 A | 11/1998 | Petri |
| 5,909,794 A | 6/1999 | Molbak |
| 5,913,399 A | 6/1999 | Takemoto |
| 5,943,655 A | 8/1999 | Jacobson |
| 5,944,162 A | 8/1999 | Filiberti |
| 5,947,257 A | 9/1999 | Schwartz |
| 5,954,576 A | 9/1999 | Coulter |
| 6,047,808 A | 4/2000 | Neubarth |
| 6,109,774 A | 8/2000 | Holmes |
| 6,196,913 B1 | 3/2001 | Geib |
| 6,328,149 B1 | 12/2001 | Blad |
| 6,494,776 B1 | 12/2002 | Molbak |
| 6,520,308 B1 | 2/2003 | Martin |
| 6,637,576 B1 * | 10/2003 | Jones et al. .................. 194/216 |
| 6,736,251 B2 * | 5/2004 | Molbak ...................... 194/347 |
| 6,758,316 B2 * | 7/2004 | Molbak ...................... 194/200 |
| 2004/0181481 A1 | 9/2004 | Carter |

FOREIGN PATENT DOCUMENTS

| | | |
|---|---|---|
| GB | 2269088 A | 2/1994 |
| JP | 404088496 A | 3/1992 |

* cited by examiner

METHOD OF EXCHANGING COINS INVOLVING NON-CASH EXCHANGE OPTIONS

RELATED APPLICATIONS

The present application is a continuation-in-part and claims priority benefit, with regard to all common subject matter, of an earlier-filed U.S. patent application titled "METHOD OF EXCHANGING COINS INVOLVING NON-CASH EXCHANGE OPTIONS", Ser. No. 10/386,764, filed Mar. 12, 2003. The identified earlier-filed application is hereby incorporated by reference into the present application.

BACKGROUND OF THE INVENTION

1. Field of the Invention

The present invention relates broadly to machines and methods for exchanging coins. More particularly, the invention concerns a method of exchanging coins that maximizes benefits to a host/operator of an implementing machine and minimizes or eliminates any transaction charges to users of the machine by providing users an establishment-specific or otherwise dedicated cash-substitute or other non-cash option in return for the coins, wherein possible non-cash exchange options include dispensing a substantially disposable cash-substitute device; storing a credit on a re-usable cash-substitute device; making a charitable donation; and crediting an account, and wherein the host/operator establishment can use the collected coins to replenish its cash drawers or to replenish its coin dispensers or dispensing machines used, for example, at or by checkstands or self-checkout stands or self-service checkout systems.

2. Description of the Prior Art

It is often desirable for businesses or other establishments, as a matter of customer service, to allow for or facilitate the quick and convenient exchange of coins by patrons. In one well-known business method, a third-party owns and operates a coin exchange machine located in a high-volume retail establishment for the convenience of the establishment's customers. The machine accepts but does not sort loose coins, tallies their value, and provides redeemable receipts in return for the coins. The machine's owner charges users a substantial percentage of the tally, often as much as 8-9%, for facilitating the exchange transaction. The establishment receives some minimal portion of this charge, often as little as 1%. The receipts are redeemed by the establishment, and the machine's owner periodically reimburses the establishment.

Unfortunately, there are a number of disadvantages associated with this business method. For example, the machine's owner must frequently retrieve the coins stored in the machine. This is typically accomplished by removing a full storage bin of mixed coin denominations and replacing it with an empty storage bin. Because the full storage bin may contain thousands of dollars worth of coins and may be very heavy, it is typically removed by security personnel and transported in an armored vehicle. Such precautions are expensive, resulting in the aforementioned substantial charge to users and the relatively low return to the hosting establishment.

Furthermore, though the establishment is eventually reimbursed for its redemptions and receives an additional 1% for its trouble, this paltry return may not suffice to make the method profitable for the establishment. Redemptions of the receipts issued by the machine are, in effect, a loan to the machine's owners. Depending on how long it takes to be reimbursed, the establishment may actually lose money. Additionally, the establishment is not guaranteed any additional sales revenue or profits associated therewith because users of the machine may simply redeem their receipts and leave without making a purchase.

Thus, under the business method of the prior art, the user of the machine suffers a very substantial charge, and the establishment receives little or no benefit. Due to these and other problems and disadvantages in the prior art, an improved method of allowing for or facilitating the quick and convenient exchange of coins is needed.

SUMMARY OF THE INVENTION

The present invention overcomes the above-described and other problems and disadvantages in the prior art by providing a method of exchanging coins that maximizes benefits to a host/operator of an implementing machine and minimizes or eliminates any transaction charges to users of the machine by providing users an establishment-specific or otherwise dedicated cash-substitute or other non-cash option in return for the coins. Possible non-cash exchange options include dispensing a substantially disposable cash-substitute device; storing a credit on a re-usable cash-substitute device; making a charitable donation; or crediting an account.

An exemplary coin exchange machine adapted to implement the method of the present invention broadly comprises a hopper; a discernment mechanism; a storage bin; a display; an input mechanism; a card dispenser; a card reader/writer; and a printer. The hopper introduces loose coins to the discernment mechanism in any appropriate manner (e.g., with a particular orientation or speed) required by the nature and operation of the discernment mechanism. The discernment mechanism identifies the denomination of each coin, maintains a running tally, and outputs a total value. The discernment mechanism may also sort the coins by denomination, which may be particularly desirable where the operating establishment uses the coins to replenish its cash drawers or to replenish its coin dispensers or dispensing machines used, for example, at or by checkstands or self-checkout stands or self-service checkout systems. The storage bin receives and securely stores the sorted or unsorted and tallied coins. The display allows the machine to communicate with a user, including communicating such information as, for example, instructions regarding use of the machine; the running tally of coins; the total value; and the one or more non-cash exchange options. The input mechanism allows the user to communicate with the machine, including such information as, for example, a user identification; a account number; or a selection from among the non-cash exchange options.

The card dispenser stores and dispenses the substantially disposable first type of cash-substitute device in response to the user's selection of this first non-cash exchange option. The disposable cash-substitute device is associated or associatable with a monetary value reflecting at least a portion of the total value of the coins tallied during the exchange transaction or of the total value.

The card reader/writer reads monetary value information from and writes monetary value information to a reusable second type of cash-substitute device in response to the user's selection of this second non-cash exchange option. The reusable cash-substitute device is adapted to store, in an electronically readable and writable manner, monetary value information reflecting at least a portion of the total value of the coins tallied during the exchange transaction.

The printer provides a receipt evidencing a charitable contribution in response to the user's selection of this third non-cash exchange option. The receipt provides all information necessary for the user to deduct the charitable contribution from his or her income tax.

The machine may be connected to a central computer whereupon is stored a user account which is credited with at least a portion of the total value of the coins tallied during the exchange transaction in response to the user's selection of this fourth non-cash exchange option.

Preferably, the disposable cash-substitute device, the reusable cash substitute, and the account are useable to purchase goods or services only from a specified establishment or consortium of establishments, thereby increasing sales revenue and profits associated therewith. Thus, the method of the present invention is concerned primarily with non-cash exchange options rather than the cash exchange provided in the prior art.

The machine is preferably owned or rented and operated by the hosting establishment, rather than being owned and operated by a third-party, as is the case in the prior art. In use, coins deposited into the hopper are sent to the discernment mechanism where they are sorted by denomination and tallied, and thereafter deposited into the storage bin for safekeeping. A total value of the coins, minus any transaction charge, is generated and displayed on the display. The user is then prompted to select one of the non-cash exchange options. If the first exchange option is selected, the card dispenser dispenses one or more of the disposable cash-substitute devices. If the second exchange option is selected, the user is prompted to insert his or her reusable cash-substitute device into the card reader/writer so that the monetary value may be written thereonto, being added to any existing balance. If the third exchange option is selected, the printer provides the receipt evidencing the charitable contribution. If the fourth exchange option is selected, the user is prompted to enter his or her name or account number to identify the account to be credited. It is contemplated that more, less, or different exchange options may be offered, including, for example, allowing selection of multiple exchange options, designating portions of the total value of the coins to each option.

Thus, it will be appreciated that the method of the present invention provides a number of distinct advantages over the prior art, including, for example, providing that the establishment own or rent and operate, rather than merely host, the machine. This distinction provides a number of benefits, including, for example, increasing profits for the establishment and decreasing or eliminating transaction charges to users of the machine. Because the establishment owns the machine, it is not required to make loans to any third-party and can, if desired, retain a higher portion of any transaction charge. Furthermore, the establishment can remove coins from the machine to replenish its own cash drawers or to replenish its coin dispensers or dispensing machines used, for example, at or by checkstands or self-checkout stands or self-service checkout systems. Relatedly, if coins are regularly removed and used in transacting ordinary business, there may be no need to arrange and pay for security personnel or armored vehicles to transport large amounts of coins, thereby further reducing costs associated with operating the machine. In light of these cost reductions, the establishment may see fit to reduce or eliminate any transaction charge associated with using the machine Furthermore, the method advantageously focuses on non-cash exchange options rather than the cash exchange disclosed in the prior art. This distinction provides a number of benefits, including avoiding situations where users simply exchange coins without making any purchases from the establishment. It will be appreciated that profits are built into such purchases, so that ensuring purchases may allow the establishment to further reduce or eliminate any transaction charge.

These and other important aspects of the present invention are more fully described in the section entitled DETAILED DESCRIPTION OF A PREFERRED EMBODIMENT, below.

BRIEF DESCRIPTION OF THE DRAWING FIGURES

A preferred embodiment of the present invention is described in detail below with reference to the attached drawing figures, wherein.

DETAILED DESCRIPTION OF A PREFERRED EMBODIMENT

With reference to the figures, a method of exchanging coins is disclosed in accordance with a preferred embodiment of the present invention. Broadly, the method allows for and facilitates exchanging coins in such a manner as to maximize benefits to a host/operator of an implementing machine and minimize or eliminate any transaction charges to users of the machine by providing users an establishment-specific or otherwise dedicated cash-substitute or other non-cash option in return for the coins. Possible non-cash exchange options include dispensing a substantially disposable cash-substitute device; storing a credit on a re-usable cash-substitute device; making a charitable donation; or crediting an account, all of which are described in detail below.

Figure 1:
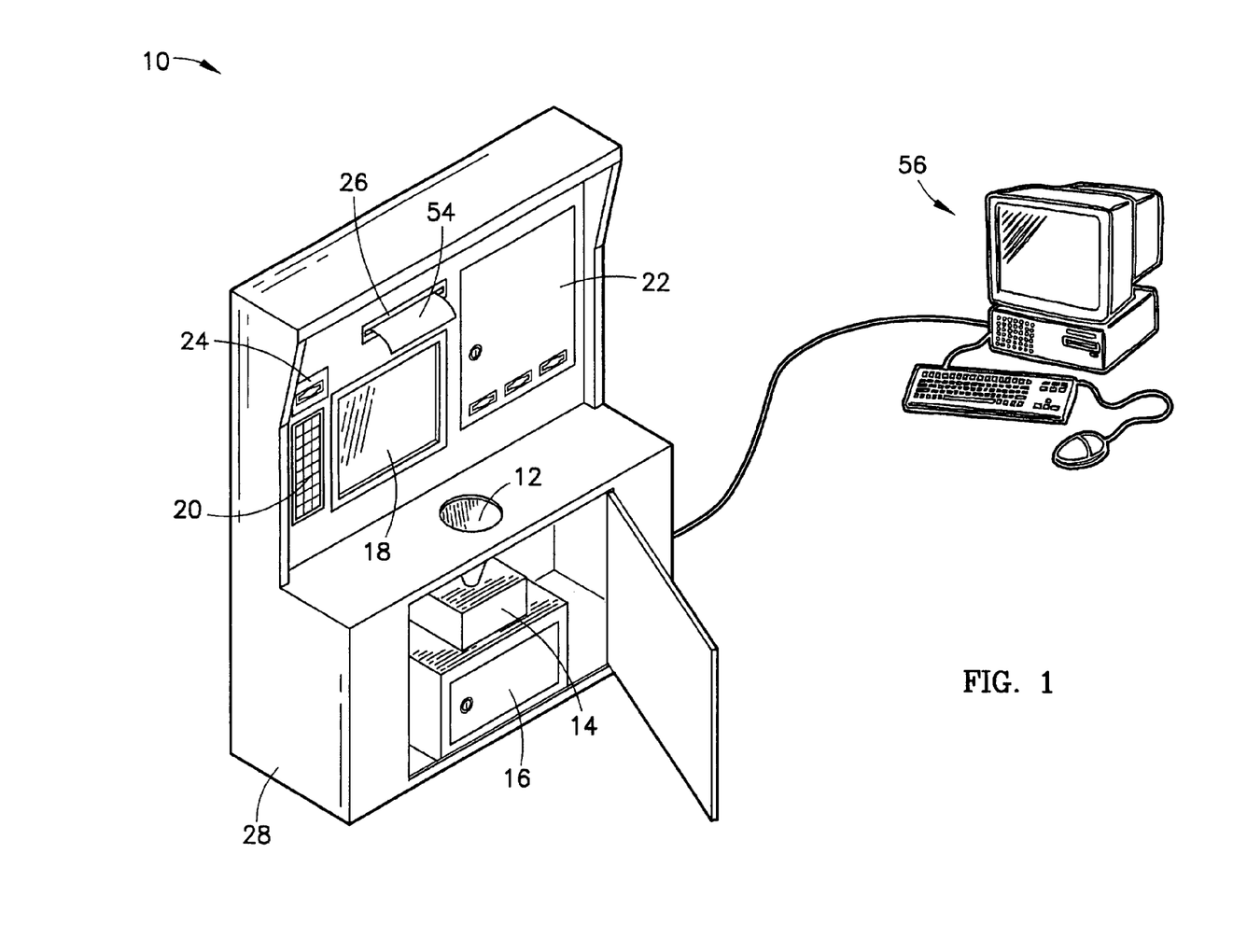
FIG. 1 is a depiction of an exemplary coin exchange machine adapted to implement a preferred embodiment of the method of the present invention.

Referring particularly to FIG. 1, a coin exchange machine 10 is shown adapted to implement a preferred embodiment of the method of the present invention. The method, however, is not limited to the particular machine shown, and may, instead, be implemented using any suitable machine or in any suitable manner. Furthermore, because a variety of sorting and counting technologies and machines are well-known in the prior art, the machine 10 is discussed herein only in the degree of detail considered necessary to clearly illustrate the method of the present invention. Broadly, the machine 10 comprises a hopper 12; a discernment mechanism 14; one or more storage bins 16; a display 18; an input mechanism 20; one or more card dispensers 22; a card reader/writer 24; a printer 26; and a housing 28.

The hopper 12 introduces loose coins to the discernment mechanism 14 in any appropriate manner, such as, for example, imparting a particular orientation or speed to the coins, required by the nature and operation of the discernment mechanism 14. The hopper 12 may be provided with any suitable shape or other feature appropriate or necessary to its function.

The discernment mechanism 14 identifies the denomination of each coin, maintains a running tally of the coins' value, and outputs a total value of the coins. The discernment mechanism 14 also preferably sorts the coins by denomination. This is a particularly important feature where the establishment desires to remove coins from the machine 10 for replenishing cash drawers or for replenishing its coin dispensers or dispensing machines used, for example, at or by checkstands or self-checkout stands or self-service checkout systems, or for other similar uses. Sorting the coins as they are received results in the coins being ready for immediate use when needed. Alternatively, the coins could be stored unsorted within the machine 10 and sorted at a later time, possibly using a stand-alone coin sorting machine. Again, a variety of technologies exist for performing these functions, any of which might be suitable or adaptable for use in implementing the discernment mechanism 14 of the machine 10.

The one or more storage bins 16 receive and securely store the sorted or unsorted and tallied coins. A single subdivided storage bin or multiple undivided storage bins may be used to segregate the sorted coins by denomination. The storage bins 16 are preferably lockable or otherwise secured or securable to prevent unauthorized entry. The storage bins 16, it will be appreciated, may take any suitable form and be constructed from any suitable material. Thus, the storage bins 16 may be, for example, hard-shelled containers or pliant bags.

The display 18 allows the machine 10 to communicate with a user. The display 18 may allow for or facilitate communicating such information as, for example, instructions regarding use of the machine 10; the running tally; the total value; and the various non-cash exchange options. The display 18 may take any suitable form, such as for example, a liquid crystal display, a plasma display, or a conventional video monitor.

The input mechanism 20 allows the user to communicate with the machine 10. The input mechanism 20 may allow for communicating such information as, for example, user identification; an account number; or a selection from among the various non-cash exchange options. The input mechanism 20 may take any suitable form, such as, for example, a numeric or alphanumeric keypad or a touchpad, or may be integrated with the display device 18 to present, for example, a virtual keypad or one or more touch-selectable buttons or icons.

Figure 2:
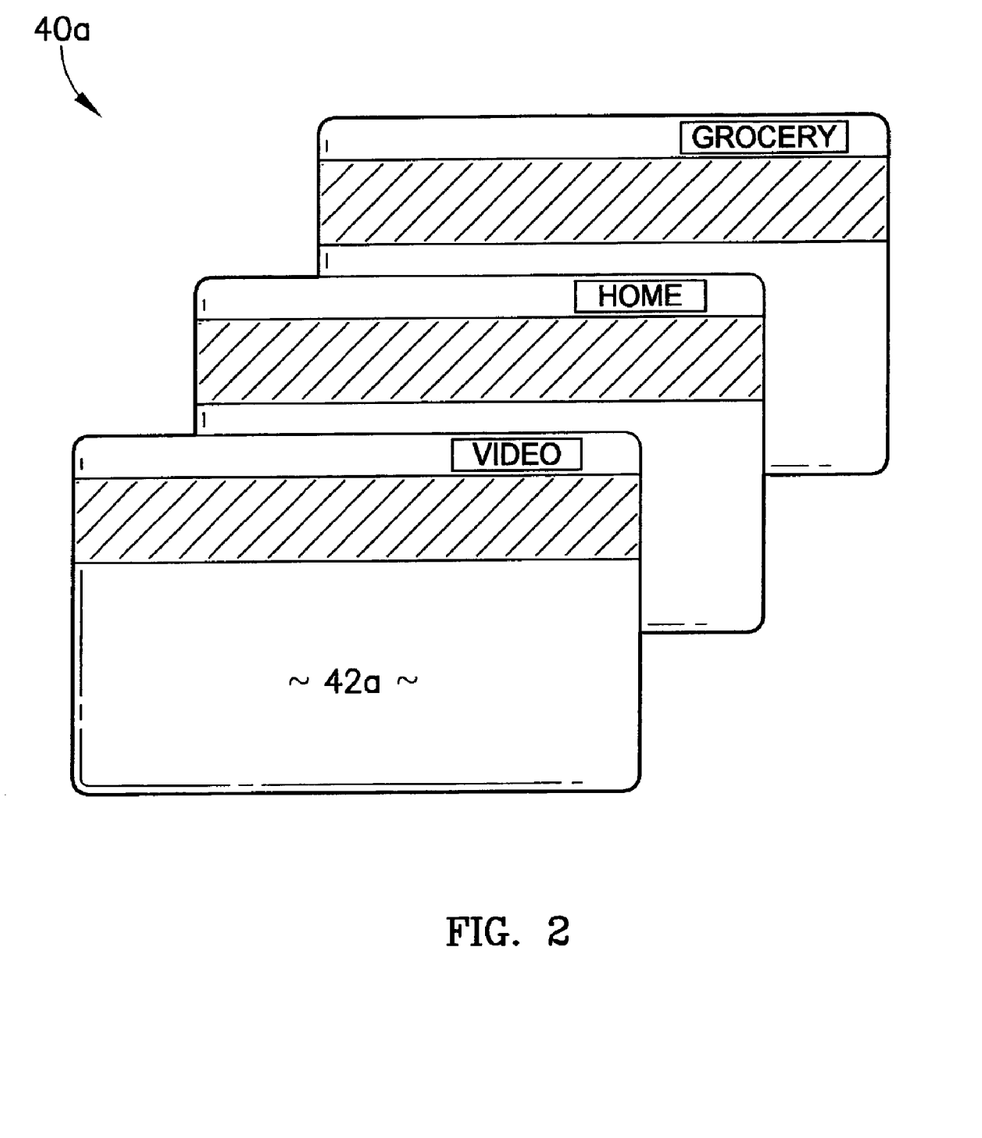
FIG. 2 is a depiction of three different first instances of a disposable first type of cash-substitute device for use with the machine of FIG. 1.
Figure 3:
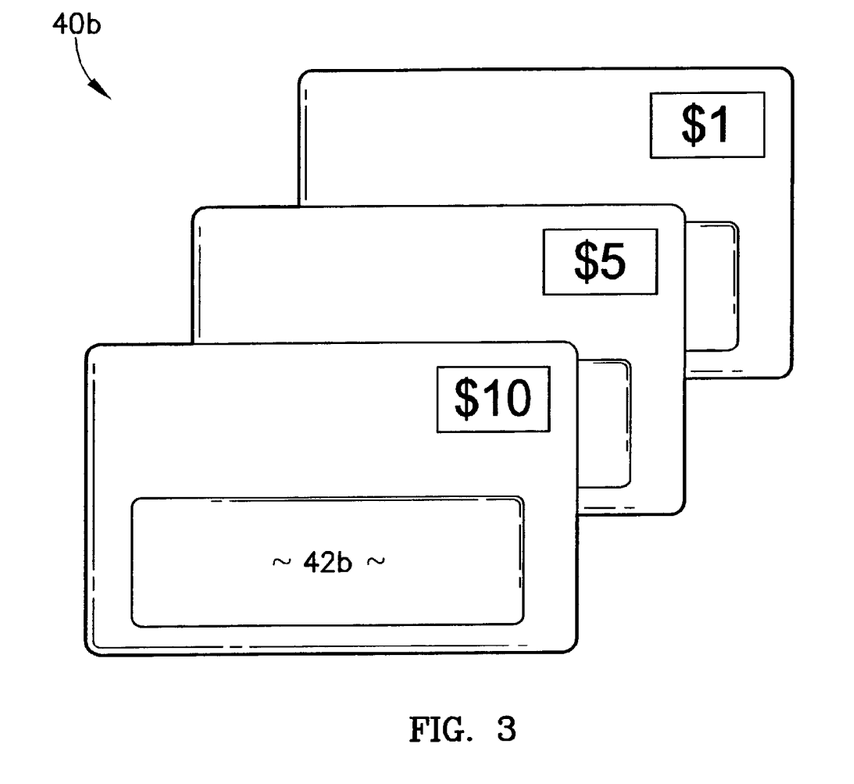
FIG. 3 is a depiction of three different second instances of a disposable first type of cash-substitute for use with the machine of FIG. 1.

The card dispenser 22 stores and dispenses a disposable first type of cash-substitute device 40a,40b, shown in FIGS. 2 and 3, in response to the user's selection of this first non-cash exchange option. The disposable cash-substitute device 40a, 40b is associated or associatable with a monetary value reflecting at least a portion of the total value of the coins tallied during the exchange transaction. The disposable cash-substitute device 40a,40b may take any suitable form, including, for example, plastic cards, chits, chips, or paper slips resembling actual money.

In one contemplated implementation, shown in FIG. 2, the disposable cash-substitute device 40a takes the form of a disposable plastic card, similar to well-known pre-paid gift or calling cards, associated with one or more specific establishments. Such a card could be provided a unique identification number, with that number corresponding to an account wherein the monetary value is stored, or, alternatively, the card could be adapted to store the monetary value in an electronically readable manner. Thus, the user might select one or more such plastic cards from among a plurality of different cards, each being associated with a different establishment or group of establishments (e.g., video rental, home improvement, groceries, dry cleaning). Where different cards are available, there may be provided a separate dispenser for each.

In another contemplated implementation, shown in FIG. 3, the disposable cash-substitute device 40b takes the form of a disposable paper card or slip on which is printed the monetary value, preferably, though not necessarily, in specific whole number increments (e.g., $10.00, $5.00, $1.00), with any remainder being returned to the user or retained as part of a transaction charge. Thus, a user who has deposited $17.25 into the machine 10 might receive either a single card on which is printed $17.25 or four cards (a $10.00 card, a $5.00 card, and two $1.00 cards) totaling $17.00. Where cards of different denominations are available, there may be provided a separate dispenser for each.

Regardless of form, the disposable cash-substitute device 40a,40b is preferably useable only to purchase goods or services from a particular establishment or consortium of establishments, the name or logo 42a,42b of which is preferably printed on a face of the disposable cash-substitute device 40a,40b to prevent later confusion on the part of the user.

Figure 4:
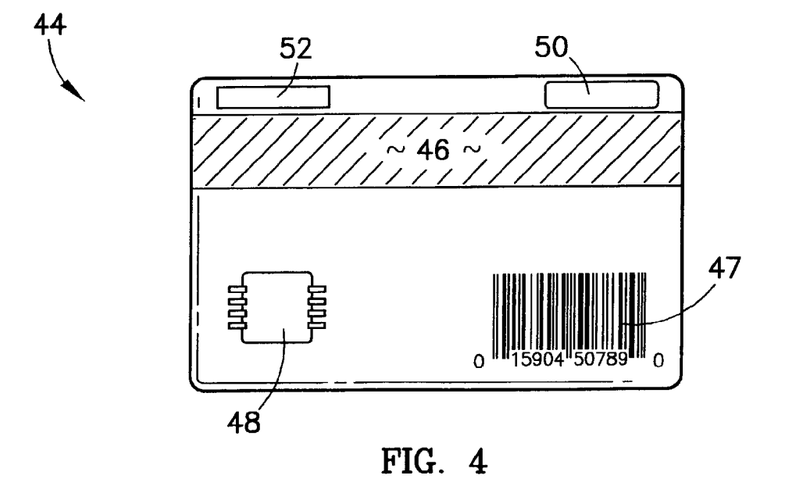
FIG. 4 is a depiction of a reusable second type of cash-substitute device for use with the machine of FIG. 1.

The card reader/writer 24 reads monetary value information from and writes monetary value information to a reusable second type of cash-substitute device 44, shown in FIG. 4, in response to the user's selection of this second non-cash exchange option. The reusable cash-substitute device 44 is operable to store, in an electronically readable and writable manner, monetary value information reflecting at least a portion of the total value of the coins tallied during the exchange transaction. The reusable cash-substitute device 44 may include, for example, a conventional magnetic strip 46 for storing the monetary value information as magnetically-encoded data; a bar code 47 for storing the monetary value information optically; or a microprocessor 48 for storing the monetary value information digitally. The reusable cash-substitute device 44 is also preferably useable only to purchase goods or services from a particular establishment or consortium of establishments, the name or logo 50 of which is preferably printed on a face of the reusable cash-substitute device 40a,40b to prevent later confusion on the part of the user. A user identifier 52 may also be provided in order to allow for identification verification to ensure appropriate or legal use by an authorized user.

The printer 26 provides a receipt 54 evidencing a charitable contribution in response to the user's selection of this third non-cash exchange option. The receipt 54 provides all information, such as, for example, the user's name or tax identification number, a total amount donated, and the charitable organization's tax identification number, necessary or desirable for the user to deduct the charitable contribution from his or her income tax. As desired, the user may be limited to contributing to a single charity, or may be allowed to select from a number of charities using the input mechanism 20.

In one contemplated implementation, an establishment or other entity might dedicate at least a portion of all exchanged or deposited coins to one or more specified charities. This implementation might be associated with a specific location, event, or time of year. For example, a chain of stores might announce that during a holiday season or for a specified period of time all coins deposited into the stores' machines 10 will be donated to a specified charitable organization. In another example, one more of the machines 10 might be provided at a state fair or other event, with all deposited coins being donated to state-specific or other event-related charitable organizations. In another example, a charitable organization might purchase and operate one or more of the machines 10, locating them in certain establishments or locations for fixed periods of time and then moving them to other establishments or locations, with at least a portion of the total value of the deposited coins being retained by the charity. It will be appreciated that by moving the machines 10 periodically, the charitable organization can reach a greater number of potential donor/users and allow exhausted locations and user/donors time to replenish their collections of loose coins.

The housing 28 encloses or houses all or portions of the aforementioned components so to protect them against a variety of environmental hazards, such as, for example, physical contact or shock, moisture, or dust. The housing 28 may take any practical or desired shape, and may provide for or facilitate the presentation for advertising material.

The machine 10 may be connected to a central computer 56 whereupon is stored a user account which is credited with at least a portion of the total value of the coins tallied during the exchange transaction in response to the user's selection of this fourth non-cash exchange option. The account is also preferably debitable only to purchase goods or services from a particular establishment or consortium of establishments. The user may be provided with an account statement each time the account is credited or debited.

Figure 5:
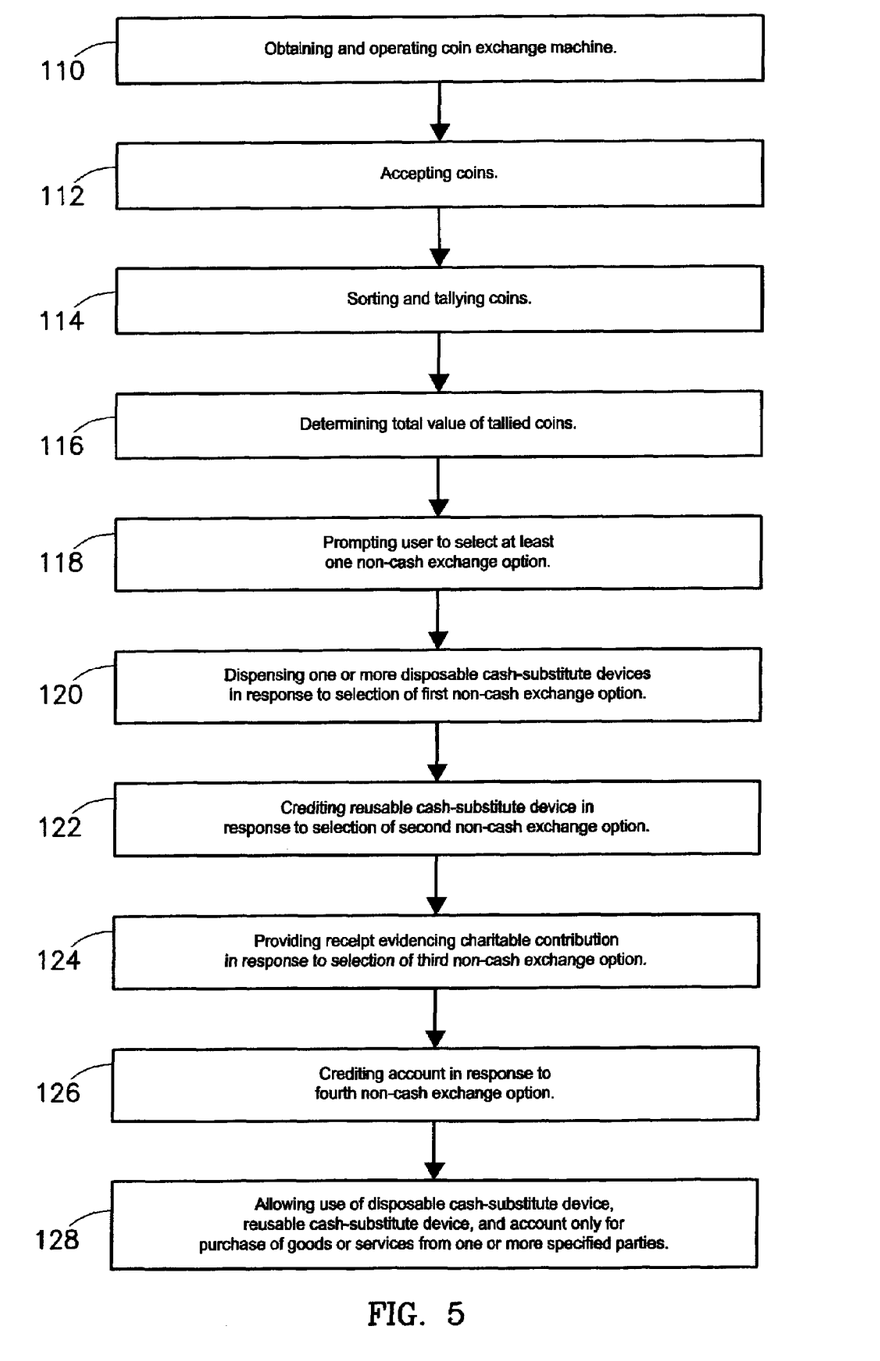
FIG. 5 is a flowchart of method steps involved in practicing the preferred embodiment of the method of the present invention.

Referring to FIG. 5, the preferred embodiment of the method, with reference to the above-described exemplary implementing machine 10, proceeds as follows. It should first be noted that the machine 10 is preferably owned or rented and operated by the hosting establishment, rather than being owned and operated by a third-party, as is the case in the prior art. This distinction provides a number of benefits, including, for example, increasing profits for the establishment and decreasing or eliminating transaction charges to users of the machine 10. More specifically, because the establishment owns the machine 10, it needs make no loans to any third-party and can, if desired, retain a higher portion of any transaction charge. Furthermore, the establishment can remove coins from the machine 10 to replenish its own cash drawers or to replenish its coin dispensers or dispensing machines used, for example, at or by checkstands or self-checkout stands or self-service checkout systems. Normally, businesses must purchase large amounts of coins at the beginning of each day in order to ensure an ample supply for transacting business; however, using coins removed from the machine 10 may substantially reduce or even eliminate this task, thereby reducing business costs. Relatedly, if coins are regularly removed and used in transacting ordinary business, there may be no need to arrange and pay for security personnel or armored vehicles to transport large amounts of coins, thereby further reducing costs associated with operating the machine 10. In light of these cost reductions, the establishment may see fit to substantially reduce or eliminate any transaction charge associated with using the machine 10. Thus, as a preliminary matter, the machine 10 is preferably purchased or rented by the establishment and made available to its patrons for use, as depicted in box 110.

In using the machine 10, the user may first be allowed an opportunity to view a demonstration on the display 18, wherein if the user wishes to view the demonstration, he or she should indicate such desire using the input mechanism 20. The user then deposits the coins into the hopper 12. The coins are accepted, as depicted in box 112, and travel from the hopper 12 into the discernment mechanism 14 where they are sorted by denomination and tallied, as depicted in box 114, and thereafter deposited into the storage bin 16 for safekeeping. A total value of the coins is generated, as depicted in box 116, and displayed on the display 18. If a transaction charge applies, the actual amount due the user is also displayed. Where more than one non-cash exchange option is available, and different transaction charges apply to two or more of the options, this information is also displayed. The user is then prompted to select from one or more non-cash exchange options, as depicted in box 118, such as, for example, the various exchange options discussed herein.

The method of the present invention is concerned primarily with non-cash exchange options rather than the cash exchange provided in the prior art. This distinction provides a number of benefits, including avoiding situations where users simply exchange coins without making any purchases from the establishment. It will be appreciated that profits are built into such purchases, so that ensuring purchases may allow the establishment to further reduce or eliminate any transaction charge. Optionally, the user may be given a choice between a cash exchange with a transaction charge or a non-cash exchange without a transaction charge.

The user may select the first non-cash transaction involving the disposable cash-substitute device 40a,40b. Once this first non-cash exchange option is selected, the card dispenser 22 will dispense one or more of the disposable cash-substitute devices 40a,40b, as depicted in box 120.

The user may alternatively select the second non-cash transaction involving the reusable cash-substitute device 44. Once the second non-cash exchange option is selected, the user is prompted to insert his or her reusable cash-substitute device 44 into the card reader/writer so that the monetary value may be written thereonto, being added to any existing balance, as depicted in box 122.

The user may alternatively select the third non-cash transaction involving making a charitable donation. As no purchase will be made, the establishment may chose to add a nominal transaction charge to this third type of transaction. Optionally, the user may be prompted to select a particular charitable organization from among several such organizations. Once the third type of non-cash exchange option is selected, the printer 26 provides the receipt evidencing the charitable contribution, as depicted in box 124.

The user may alternatively select the fourth non-cash transaction involving depositing at least a portion of the total value into an account maintained by the establishment on the central computing device 56. Once the fourth type of non-cash exchange option is selected, the user will be prompted to enter his or her name or account number to identify the account to be credited, as depicted in box 126. The user may be provided with an account statement at that time to verify the deposit.

As mentioned, the disposable cash-substitute device, the reusable cash substitute, and the account are preferably useable to purchase goods or services only from a specified establishment or consortium of establishments, as depicted in box 128, thereby increasing sales revenue and profits associated therewith.

Though the machine 10 and method have been described as allowing for at least four different types of non-cash exchange options, it is contemplated that in some applications more, less, or different non-cash exchange options may be provided. For example, a charitable organization might rent the machine 10 during the Christmas holiday season, and allow only for donating the total value of the coins to the hosting organization, charging no transaction fee. In another example, a small store might purchase the machine 10 as a matter of customer service and to boost sales, and allow only for depositing the total value of the coins, minus a small transaction charge, into an account maintained by the store. It is also contemplated that the user may be allowed to select multiple non-cash exchange options, designating or allocating portions of the total value of the coins to each chosen option.

From the preceding description, it will be appreciated that the method of the present invention provides a number of distinct advantages over the prior art, including, for example, providing for the establishment to own or rent and operate, rather than merely host, the machine. This distinction provides a number of benefits, including, for example, increasing profits for the establishment and decreasing or eliminating transaction charges to users of the machine. More specifically, because the establishment owns the machine, it needs make no loans to any third-party and can, if desired, retain a higher portion of any transaction charge. Furthermore, the establishment can remove coins from the machine to replenish its own cash drawers or to replenish its coin dispensers or dispensing machines used, for example, at or by checkstands or self-checkout stands or self-service checkout systems. Relatedly, if coins are regularly removed and used in transacting ordinary business, there may be no need to arrange and pay for security personnel or armored vehicles to transport large amounts of coins, thereby further reducing costs associated with operating the machine. In light of these cost reductions, the establishment may see fit to substantially reduce or eliminate any transaction charge associated with using the machine Furthermore, the method advantageously focuses on non-cash exchange options rather than the cash exchange disclosed in the prior art. This distinction provides a number of benefits, including avoiding situations where users simply exchange coins without making any purchases from the establishment. It will be appreciated that profits are built into such purchases, so that ensuring purchases may allow the establishment to further reduce or eliminate any transaction charge.

Although the invention has been described with reference to the preferred embodiment illustrated in the attached drawings, it is noted that equivalents may be employed and substitutions made herein without departing from the scope of the invention as recited in the claims. As mentioned, for example, more, less, or different cash-substitute or other non-cash exchange options than those disclosed herein may be provided. Also as mentioned, the particular machine described herein represents but one possible manner of implementing the method of the present invention.

Having thus described the preferred embodiment of the invention, what is claimed as new and desired to be protected by Letters Patent includes the following:

1. A method of exchanging a plurality of loose coins using a machine located in a host establishment, the method comprising the steps of:
   (a) accepting the plurality of loose coins into the machine;
   (b) tallying the plurality of loose coins to determine a total value;
   (c) dispensing a substantially disposable cash-substitute device representing at least a portion of the total value, wherein the substantially disposable cash-substitute device can only be used to purchase goods or services from one or more specified parties; and
   (d) using at least a portion of the plurality of loose coins to replenish one or more coin dispensing machines located in the host establishment.

2. The method as set forth in claim 1, further including the step of using at least a portion of the plurality of loose coins to replenish one or more cash drawers located in the host establishment.

3. The method as set forth in claim 1, further including the step of charging no fee for exchanging the plurality of loose coins.

4. A method of exchanging a plurality of loose coins using a machine located in a host establishment, the method comprising the steps of:
   (a) accepting the plurality of loose coins into the machine;
   (b) tallying the plurality of loose coins to determine a total value;
   (c) storing on a re-usable cash-substitute device a credit for at least a portion of the total value, wherein the re-useable cash-substitute device can only be used to purchase goods or services from one or more specified parties; and
   (d) using at least a portion of the plurality of loose coins to replenish one or more coin dispensing machines located in the host establishment.

5. The method as set forth in claim 4, further including the step of using at least a portion of the plurality of loose coins to replenish one or more cash drawers located in the host establishment.

6. The method as set forth in claim 4, further including the step of charging no fee for exchanging the plurality of loose coins.

7. A method of exchanging a plurality of loose coins using a machine located in a host establishment, the method comprising the steps of:
   (a) accepting the plurality of loose coins into the machine;
   (b) tallying the plurality of loose coins to determine a total value;
   (c) crediting an account for at least a portion of the total value, wherein the account can only be used to purchase goods or services from one or more specified parties; and
   (d) using at least a portion of the plurality of loose coins to replenish one or more coin dispensers located in the host establishment.

8. The method as set forth in claim 7, further including the step of using at least a portion of the plurality of loose coins to replenish one or more cash drawers located in the host establishment.

9. The method as set forth in claim 7, further including the step of charging no fee for exchanging the plurality of loose coins.

10. A method of exchanging a plurality of loose coins using a machine located in a host establishment, the method comprising the steps of:
    (a) accepting the plurality of loose coins into the machine;
    (b) tallying the plurality of loose coins to determine a total value;
    (c) allowing a user to select at least one non-cash exchange option from among two or more non-cash exchange options, wherein each of the two or more non-cash exchange options provides a result that can only be used to purchase goods or services from one or more specified parties; and
    (d) using at least a portion of the plurality of loose coins to replenish one or more coin dispensing machines located in the host establishment.

11. The method as set forth in claim 10, wherein the two or more non-cash exchange options include dispensing a disposable cash-substitute device; storing a credit on a re-usable cash-substitute device; and crediting an account.

12. The method as set forth in claim 10, further including the step of allowing the user to select at least two non-cash exchange options from among the two or more non-cash exchange options and to allocate a portion of the total value to each of the selected at least two non-cash exchange options.

13. The method as set forth in claim 10, further including the step of using at least a portion of the plurality of loose coins to replenish one or more cash drawers located in the host establishment.

14. The method as set forth in claim 10, further including the step of charging no fee for exchanging the plurality of loose coins.

15. A method of exchanging a plurality of loose coins using a machine located in and operated by a host establishment, the method comprising the steps of:

(a) accepting into the machine the plurality of loose coins;
(b) sorting within the machine the plurality of loose coins;
(c) tallying within the machine the plurality of loose coins to automatically determine a total value;
(d) dispensing from the machine a device reflecting at least a portion of the total value;
(e) removing from the machine at least a portion of the plurality of coins; and
(f) using the removed portion of the plurality of coins to replenish a coin supply of a checkout lane.

* * * * *